United States Patent [19]
Gaisser et al.

[11] Patent Number: 4,771,794
[45] Date of Patent: Sep. 20, 1988

[54] METHOD AND APPARATUS FOR CONTROLLING AT LEAST TWO PHYSICAL PROPERTIES, DECISIVE FOR THE QUALITY OF THE FINISHED PRODUCT, OF A ROD MADE OF SMOKABLE MATERIAL

[75] Inventors: Horst Gaisser, Hassloh; Paul-Georg Henning, Quickborn; Heinz-Werner Masurat, Tangstedt; Meinhard Meyer, Appen-Unterglinde; Manfred Kühne, Furtwangen; Friedrich Walther, Bargteheide, all of Fed. Rep. of Germany

[73] Assignee: B.A.T. Cigarettenfabriken GmbH, Hamburg, Fed. Rep. of Germany

[21] Appl. No.: 30,305

[22] Filed: Mar. 26, 1987

[30] Foreign Application Priority Data

Apr. 24, 1986 [DE] Fed. Rep. of Germany ....... 3613957

[51] Int. Cl.⁴ ............................ A24C 5/14; A24C 5/31
[52] U.S. Cl. .................................. 131/84.1; 131/84.4; 131/906; 131/908
[58] Field of Search .............. 131/84.1, 84.4, 904–906, 131/908

[56] References Cited

U.S. PATENT DOCUMENTS 4,248,139 2/1981 Labbe .
4,280,518 7/1981 Revland ............................ 131/84.4
4,326,542 4/1982 Laszlo et al. ........................ 131/908
4,595,027 6/1986 Higgins et al. ..................... 131/908
4,615,342 10/1986 Federle et al. .
4,616,662 10/1986 Hartmann et al. ................ 131/84.1

FOREIGN PATENT DOCUMENTS 2208944 9/1973 Fed. Rep. of Germany .
3306543 8/1984 Fed. Rep. of Germany .

Primary Examiner—Vincent Millin
Attorney, Agent, or Firm—Armstrong, Nikaido, Marmelstein & Kubovcik

[57] ABSTRACT

In a method and an apparatus for controlling the physical properties of a rod of smokable material the actual values of at least two physical properties, in particular resistance to draw and hardness or deformation of the tobacco rod or of the smokable article, are detected; the differences between said actual values and predetermined desired values are determined and control signals derived therefrom; said control signals are compared with each other and the particular instantaneously largest control signal is supplied to a single actuator, that is an écrêteur or a hopper. An auto-selector circuit with maximum selection is used to compare the control signals.

13 Claims, 3 Drawing Sheets

METHOD AND APPARATUS FOR CONTROLLING AT LEAST TWO PHYSICAL PROPERTIES, DECISIVE FOR THE QUALITY OF THE FINISHED PRODUCT, OF A ROD MADE OF SMOKABLE MATERIAL

BACKGROUND OF THE INVENTION

1. Field of the Invention

The invention relates to a method and an apparatus for controlling physical properties of a rod made of smokable material.

2. Description of the Prior Art

Although similar problems arise in other smokable articles as well hereinafter these problems will be discussed only in conjunction with the manufacture of cigarettes.

In the manufacture of cigarettes various techniques are used to permit continuous control of the physical properties of the rod of tobacco fibres during the cigarette production and thus finally of the corresponding properties of the finished cigarette. It is, for example known to determine the density of the rod essential to the weight constancy of the cigarette and corresponding in turn to its weight, to compare the actual value determined with a desired value and to control the formation of the rod in dependence upon the result of this comparison (German Offenlegungsschrift No. 2 208 944). For measuring the density for example the absorption of radiation in the rod of tobacco fibres may be utilized, in particular the absorption of beta rays or microwaves.

German Offenlegungsschrift No. 2 728 797 also describes a method of making cigarette filters in which the resistance to draw of the filter tow is determined, compared with a desired value and the result of the comparison used for the filter tow supply; the tow supply is controlled so that the pressure drop across the measured tow remains substantially constant.

A further method is disclosed in the published European patent application No. 32 399, the moisture content, the mass, the machine speed and the hardness of a rod of tobacco fibres being determined for the control; the measured hardness value is corrected by means of the other parameters, i.e. moisture content, mass and machine speed, thereby giving a corrected actual value which is compared with a desired value. Depending on the result of this comparison the écrêteur (trimmer discs) is adjusted and set at a predetermined height of the tobacco rod in the formation of the latter.

Sensors suitable for detecting the hardness of the tobacco rod are disclosed in German Offenlegungsschrift No. 3 306 543 and German Offenlegungsschrift No. 3 404 635.

The method hitherto usual in practice of weight/density control has, however, the following disadvantages: on changes of the tobacco filling capacity large deviations of the resistance to draw or the hardness of the tobacco rod may occur leading to end dropout; large deviations in the resistance to draw also have an unfavourable effect on the drawability, fullness of flavour and character as well as the degree of ventilation of the finished cigarette. The hardness and the resulting end dropout of a cigarette are, however, important quality features to the consumer.

The regulation of the hardness, possibly also taking account the moisture, the mass and the machine speed, also leads, however, to problems because, although an important quality feature can be kept constant; the other physical properties, in particular density/weight and resistance to draw, are no longer taken into account. Thus, once again great fluctuations can occur which have an unfavourable effect on the quality of the finished cigarette.

Moreover, further problems result due to the use of expanded and reconstituted tobacco as is employed to an increasing extent. For when mixture fluctuations occur the sensor for the density or the weigth of the tobacco rod "detects" too little tobacco, i.e. proportionally the rod contains too much expanded tobacco in its mixture so that the actuator for the weight control, generally the écrêteur (trimmer discs) is adjusted in the sense of enlarging the rod as a result more tobacco enters the cigarette. This, however, increases the resistance to draw and the hardness of the cigarettes and thus quality features which are important to the consumer; as a rule, the consumer will notice changes in the resistance to draw and hardness sooner than small fluctuations in the weight of the cigarette.

SUMMARY OF THE INVENTION

The invention therefore has as its object to provide a method and an apparatus for controlling at least two physical properties of a rod of smokable material decisive for the quality of the finished product, in particular in cigarette manufacture, in which none of these properties lies in the finished product outside the predetermined limit values.

The invention therefore proposes in a method for controlling at least two physical properties, decisive for the quality of the finished product, of a rod made of smokable material, in particular in cigarette manufacture, in which the actual values of said properties are detected, the particular differences between the actual values and the associated predetermined desired values are determined and from the determined differences control signals are obtained for actuators influencing the mass of the smokable material making up the rod, the improvement that the control signals obtained are compared with each other and the particular instantaneously largest control signal is supplied to a single actuator for the mass flow of the smokable material.

In an apparatus for carrying out the aforementioned method comprising at least two sensors for detecting the actual values of two physical properties of the rod, as well as controllers for deriving control signals for the actuators influencing the mass of the smokable material making up the rod from the differences between the individual actual values and desired values of the physical properties, the invention proposes providing an auto-selector circuit for comparing the obtained control signals with each other and for supplying the particularly instantaneously largest control signal to a single actuator for the mass flow.

Advantageous forms of embodiment are set forth in the subsidiary claims.

The advantages achieved with the invention are based on the fact that at least two selected physical properties of the rod of smokable material, in a preferred embodiment the hardness, the resistance to draw and/or the weight of the rod or of the smokable article, are controlled within certain tolerance limits to constant values. The control signals obtained for at least two of these quantities, according to a preferred embodiment for the resistance to draw and the hardness, are compared with each other and the particular instantaneously largest control signal is supplied to a single actuator for the tobacco mass flow, in particular an écretêur (trimmer discs) or a hopper (spreader).

This method can be used in all already installed conventional cigarette making machines by installing the corresponding sensors for the actual values of the various physical quantities and processing their output signals in the manner claimed.

The control means uses only the conventional modules of compact controllers as can be obtained without difficulty, i.e. no specially made parts are necessary; alternatively, the control means can be implemented by a programmable microprocessor.

This method also permits a more exact setting of the essential quality parameters of a cigarette, thus reducing waste because the controlled variables used are the direct quality parameters, namely resistance to draw and deformation.

For the circuit implementation of the method an auto-selector logic circuit is employed which is generally referred to as selection circuit or in the present case as maximum selection circuit. The corresponding control technique steps can be implemented by a controller.

In the maximum selection, the only form of relevance to cigarette rod control, only the controller having at that instant the largest manipulated variable acts on the actuator, i.e. the écrêteur so that this can also be referred to as an override control.

The transfer of the control from the active controller at any instant to the or a waiting controller takes place whenever the output signal of the or a waiting controller is greater than that of the active controller. During operation at any time a smooth transfer from the controller acting at any instant to the or a waiting controller must be ensured. For this purpose the feedback signal of all the controllers must be subjected to the instantaneous value of the manipulated variable acting on the actuator.

It is possible to combine the output signals of at least two sensors by weighting adding members as is usual in control technology, and thereby obtain a further "fine tuning" for the control behaviour.

The simultaneous monitoring or control of a plurality of physical properties, for example the hardness and mass or the height of the rod during cigarette production, is generally known to the expert although linking of the controls is always done essentially on the principle of cascade control. The application of the priority or selection control principle has so far not been considered in the field of rod production of smokable articles.

BRIEF DESCRIPTION OF THE DRAWINGS

The invention will be described in detail hereinafter with the aid of examples of embodiment with reference to the accompanying schematic drawings, wherein.

DESCRIPTION OF THE PREFERRED EMBODIMENTS

Figure 1:
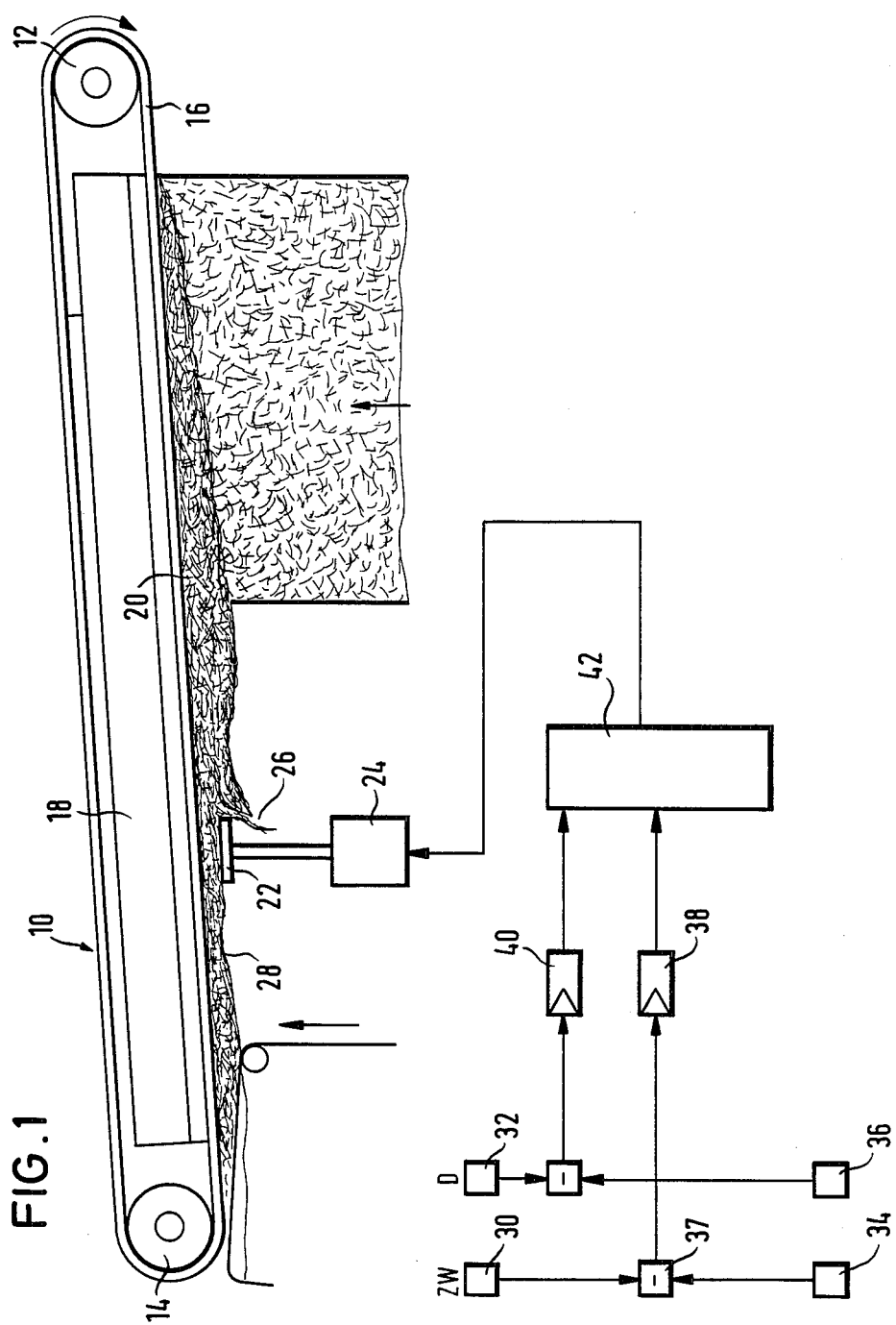
FIG. 1 shows the basic structure of a control apparatus for resistance to draw and hardness.

The rod-making machine indicated generally by the reference numeral 10 in FIG. 1 comprises two rotatably mounted rollers 12 and 14, at least one of which is driven. Over the two rollers 12 and 14 runs a perforated belt 16 serving as conveying means. Between the two runs of the belt 16 a vacuum chamber 18 is disposed.

The tobacco brought up from below in the direction of the arrow is sucked by the partial vacuum onto the belt 16 circulating in the direction of the arrow and entrained so that a tobacco layer 20 forms on the belt 16. An "equalizer", i.e. écrêteur (trimmer discs) 22, is used to set a tobacco layer 20 of predetermined density, and in the illustration of FIG. 1 said disc can be displaced in the vertical direction via a servo motor 24. The excess tobacco cut off by the écrêteur 22 is indicated by the reference numeral 26.

This gives on the belt 16 an equalized tobacco layer of predetermined height which is indicated by the reference numeral 28 and is brought into rod form by means of a format finger and enclosed by cigarette paper.

At the tobacco rod or the finished cigarette cut to the particular length two physical properties are measured, i.e. the resistance to draw ZW and the hardness or deformation D.

The corresponding actual values are supplied from a sensor 30 for the resistance to draw ZW and a sensor 32 for the deformation D together with the corresponding desired values from desired value generators 34 and 36 to a first differentiating member 37 for the resistance to draw ZW and a second differentiating member 39 for the hardness or deformation D. The difference signals from the two differentiating members 37, 39 are supplied to two associated controllers 38, 40 which form corresponding control signals generally in accordance with a predetermined control characteristic.

The two control signals are supplied to an auto-selector circuit 42 which detects the particular largest of the control signals and drives the servo motor 24 for the écrêteur 22 by means of said largest control signal.

In normal operation the position of the écrêteur 22 is set in accordance with the resistance to draw ZW, i.e. the resistance to draw controller 38 controls the rod production.

However, on excessive increase of the deformation D or reduction of the hardness the finished cigarette product no longer corresponds to the preset properties so that when the output signal of the controller 40 is too large said controller takes over the control of the écrêteur 22, i.e. in this case the auto-selector circuit 42 selects the output signal of the controller 40 and employs said signal dependent on the measured deformation D for setting the écrêteur 22.

Now, slight deviations necessarily occur in the resistance to draw ZW; however, these deviations can be accepted in comparison with excessive fluctuations in the deformation D or hardness.

In such a case, caused for example by the effects of interfering parameters in particular by inhomogeneous cut tobacco the actual controlled variable, i.e. the resistance to draw ZW, remains uncontrolled until the conditions in the rod formation permit changing to normal operation again. This further transfer, similar to the transfer from resistance to draw control to hardness control, also takes place automatically and smoothly.

When the disturbances which have occurred have died down, for example the inhomogeneous condition of the cut tobacco (tobacco mat), the deformation D decreases and the hardness increases so that once again the controller 38 for the resistance to draw ZW takes over the setting of the écrêteur 22.

Figure 2:
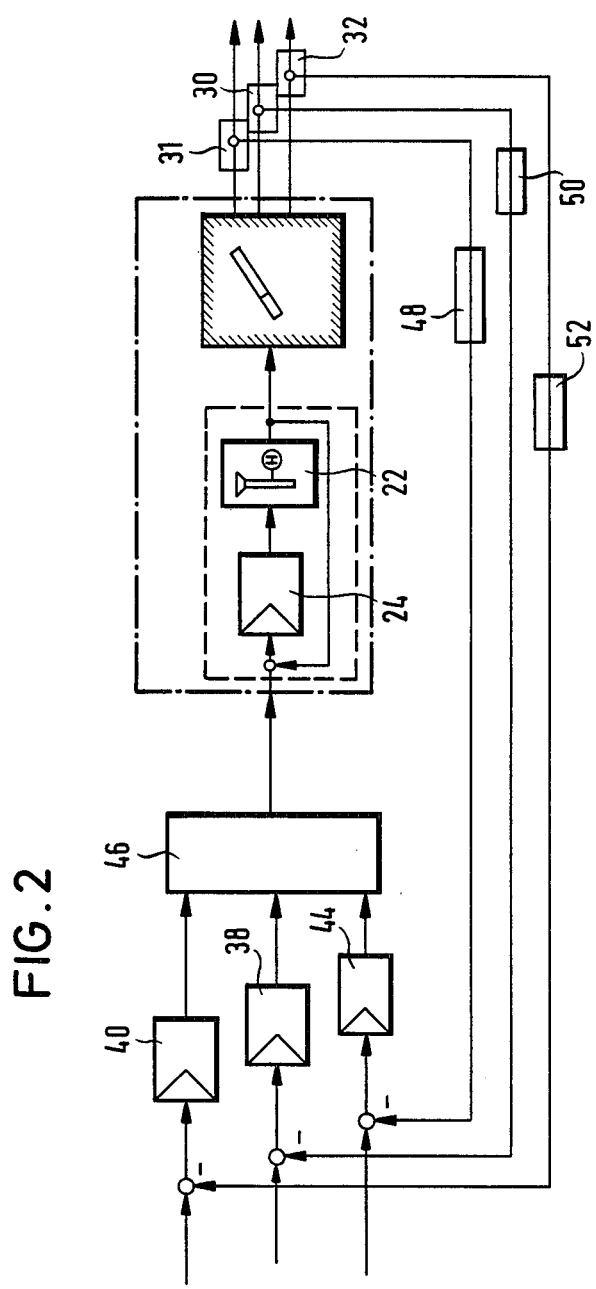
FIG. 2 is another view of a control apparatus for hardness, resistance to draw and weight.

FIG. 2 shows in a different illustration an embodiment with three controlled variables, i.e. apart from resistance to draw ZW and hardness or deformation D a weight control is provided. The linking of the three control systems with the controllers 38, 40 and 44 is via an auto-selector circuit 46 which drives the servo motor 24 for the equalizer, i.e. the écrêteur 22. Also indicated in this Figure are the formating and gluing with the subsequent sensors 30, 31 and 32 for the weight, the resistance to draw ZW and the hardness or deformation D of the tobacco rod or finished cigarette.

In the lines conducting the actual values for weight, resistance to draw and hardness from the sensors 30, 31 and 32 to the respective controllers 38, 40 and 44 there are limit-value circuits 48, 50 and 52 which in a manner known per se compare the particular actual value with a predetermined limit value; when one of these limit values is exceeded they generate a reject signal, i.e. the corresponding cigarette is detected as waste and ejected, for example by blowing out.

Finally, further variables, for example the speed of the tobacco rod or the moisture content of the tobacco, can be supplied to said control system. These variables are combined with the output signals of the sensors 30, 31, 32 so that subsequently corrected actual values are obtained for the control.

Figure 3:
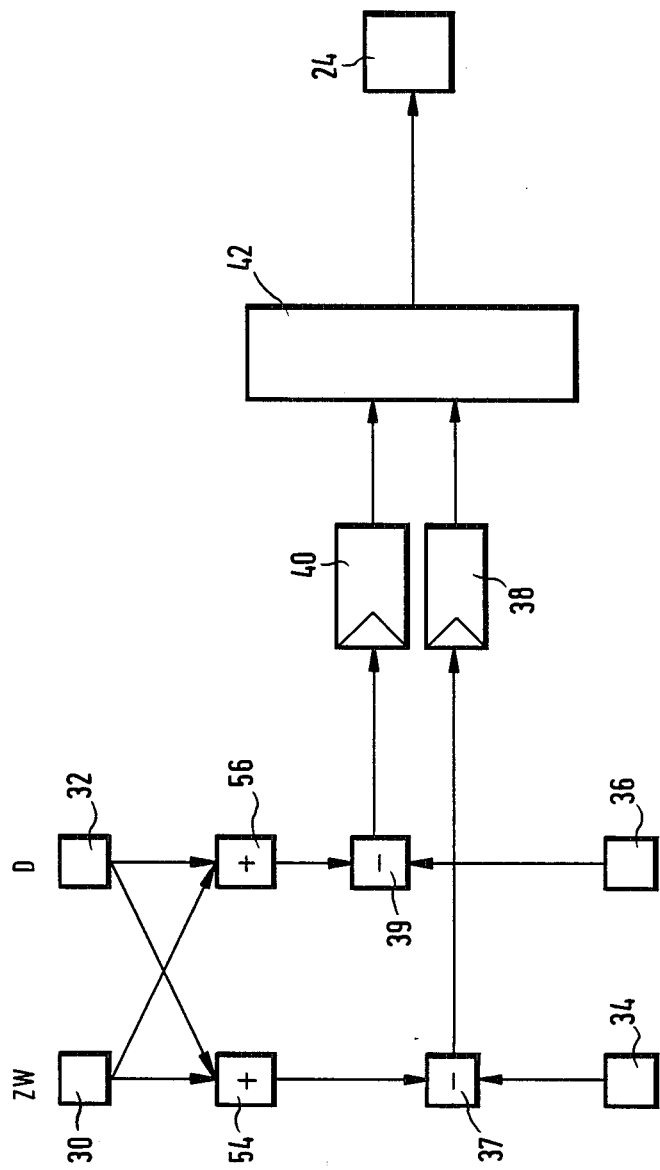
FIG. 3 shows an embodiment in which the output signals of two sensors are combined by weighting adding members.

FIG. 3 shows an embodiment in which the two actual values for the resistance to draw ZW and the hardness or deformation D are supplied from the two sensors 30, 32 to two weighting adder members 54, 56 of the type used in control technology for the linear combination of actual values.

The output signals of the two adder members 54, 56 are then supplied to the two differentiating members 37, 39. Further processing is as in the embodiment of FIG. 1.

The output signals of the two sensors 30, 32 are thus linearly combined by the two adder members 54, 56 in such a manner that the signals supplied to the two differentiating members 37, 39 have the following form:

$$\alpha ZW + \beta D$$

$$\gamma ZW + \delta D$$

In corresponding manner the output signals of three sensors can also be combined with each other.

We claim:

1. A method of controlling at least two physical properties determinative of the quality of a finished product such as a rod of smokable material which includes the steps of:
   detecting the value of each of said physical properties,
   comparing the value of each of said physical properties with a predetermined desired value for each of said physical properties,
   generating a control signal based on the difference between each of said physical properties and said desired value for each of said physical properties,
   comparing said control signals with each other and supplying the particular instantaneous largest control signal to an actuator operable to increase or decrease the mass flow of said smokable material depending upon which control signal is supplied to said actuator.

2. The method according to claim 1, wherein said physical properties are selected from the group consisting of hardness of the rod of smokable material, resistance to draw of the rod of smokable material and the weight of the rod of smokable material.

3. The method according to claim 1 wherein the value of each physical property is combined with the value of each of the other physical properties and each resulting combination is compared with a predetermined value for each of said combinations of physical properties.

4. The method according to claim 1 wherein said actuator is operatively connected to a pair of trimmer discs controlling the thickness of said mass flow of smokable material.

5. The method according to claim 1 wherein said actuator is operatively connected to a hopper controlling the quantity of smokable material delivered to said mass flow.

6. The method according to claim 1 wherein said actual value for at least one of said physical properties is corrected relative to the moisture content of the smokable material.

7. The method according to claim 1 wherein said actual value for at least one of said physical properties is corrected relative to the speed at which said mass of smokable material is flowing.

8. Apparatus for controlling the quality of a rod of smoking material comprising:
   at least two sensors respectively detecting the actual value of at least two physical properties determinative of the equality of said rod of smoking material and emitting signals indicative thereof,
   controller means receiving said signals from said sensors and comparing each said signal indicative of the actual value of one of said physical properties with a predetermined desired value of said physical property and emitting a control signal indicative of each said comparison,
   an auto-selector circuit receiving said control signals from said controller means and capable of comparing said control signals and emitting the instantaneous largest control signal; and
   an actuator receiving said largest control signal from said auto-selector circuit and operatively connected to means capable of increasing or decreasing the mass of smokable material provided in the manufacture of said rods of smokable material depending upon the control signal emitted by said auto-selector circuit.

9. The apparatus defined by claim 8 wherein sensors are provided for detecting the actual of at least two physical properties selected from the group consisting of hardness of the rod of smokable material, resistance to draw of the rod of smokable material and the weight of the rod of smokable material.

10. The apparatus defined by claim 8 further including means for combining the output signal of each sensor with the output signal of each other sensor and emitting the combination of signals for each respective combination of physical properties as signals indicative of the actual value of each combination of said physical properties to said controller means.

11. The apparatus defined by claim 10 wherein said means for combining said output signals comprise weighting adder members receiving signals from each of said sensors.

12. The apparatus defined by claim 8 wherein said actuator is operatively connected to a pair of trimmer discs controlling the thickness of said mass flow of smokable material.

13. The apparatus defined by claim 8 wherein said actuator is operatively connected to a hopper controlling the quantity of smokable material delivered to said mass flow.

* * * * *